United States Patent [19]
Knox

[11] Patent Number: 5,627,854
[45] Date of Patent: May 6, 1997

[54] SATURABLE BRAGG REFLECTOR

[75] Inventor: Wayne H. Knox, Rumson, N.J.

[73] Assignee: Lucent Technologies Inc., Murray Hill, N.J.

[21] Appl. No.: 404,664

[22] Filed: Mar. 15, 1995

[51] Int. Cl.$^6$ ........................................ H01S 3/08
[52] U.S. Cl. ........................................ 372/99; 372/18
[58] Field of Search ........................... 372/96, 99, 18, 372/838

[56] References Cited

U.S. PATENT DOCUMENTS

| | | | |
|---|---|---|---|
| 4,790,635 | 12/1988 | Apsley | 350/356 |
| 5,007,059 | 4/1991 | Keller et al. | 372/18 |
| 5,093,695 | 3/1992 | Cunningham et al. | 357/15 |
| 5,115,441 | 5/1992 | Kopf et al. | 372/99 |
| 5,115,442 | 5/1992 | Lee et al. | 372/96 |
| 5,206,526 | 4/1993 | Liu et al. | 257/185 |
| 5,212,706 | 5/1993 | Jain | 372/23 |
| 5,237,577 | 8/1993 | Keller et al. | 372/11 |
| 5,239,550 | 8/1993 | Jain | 372/49 |
| 5,278,855 | 1/1994 | Jacobovitz-Veselka et al. | 372/11 |
| 5,345,454 | 9/1994 | Keller | 372/26 |
| 5,436,756 | 7/1995 | Knox et al. | 359/260 |

OTHER PUBLICATIONS

"The Revolution in Femtosecond Near–infrared Pulse Generation", W. H. Knox, *Optics & Photonics News*, May 1992, pp. 10–14.

"Theory of coupled–cavity mode locking with a resonant nonlinearity," H. A. Haus, et al., *J. Opt. Soc. Am. B*, vol. 8, No. 6, Jun. 1991, pp. 1252–1258.

"Coupled–cavity resonant passive mode–locked Ti:sapphire laser," U. Keller et al., *Optics Letters*, vol. 15, No. 23, Dec. 1, 1990, pp. 1377–1379.

"Ultrafast Solid–State Mode–Locked Lasers Using Resonant Nonlinearities," U. Keller et al., IEEE J. Quan. Elec., vol. 28, No. 10, Oct. 1992, pp. 2123–2133.

*Primary Examiner*—Rodney B. Bovernick
*Assistant Examiner*—Robert E. Wise
*Attorney, Agent, or Firm*—Gregory C. Ranieri

[57] ABSTRACT

Low optical loss and simplified fabrication are achieved by a nonlinear reflector which incorporates one or more semiconductor quantum wells within a standard semiconductor quarter wave stack reflector. The nonlinear reflector provides an intensity dependent response which permits it to be used for saturable absorption directly in a main oscillating cavity of a laser. Saturation intensity of the nonlinear reflector and thereby related laser modelocking properties can be controlled by disposing the quantum well at a particular position in the reflector structure.

10 Claims, 3 Drawing Sheets

5,627,854

SATURABLE BRAGG REFLECTOR

TECHNICAL FIELD

This invention relates to a semiconductor device and, more particularly, to an intensity dependent reflector for use in modelocking lasers for the generation of ultrashort optical pulses.

BACKGROUND OF THE INVENTION

Semiconductor saturable absorbers have found applicability as modelocking elements in solid state lasers for generating extremely short duration optical pulses. These pulses are commonly called ultrashort pulses because they exhibit pulse widths in the picosecond and sub-picosecond ranges. Ultrashort optical pulses are useful for high speed signal processing and data communications.

The saturable absorber allows passive modelocking of a laser when the absorber, which is a nonlinear element, is placed either within the lasing optical cavity or in an optical cavity, coupled and external to the lasing cavity. Saturable absorbers act as shutters to incident radiation because they can change their opacity as a function of the intensity of the incident radiation at a particular wavelength. A saturable absorber can absorb all weak incident radiation. As the intensity of incident radiation reaches a sufficiently high level known as the saturation intensity, incident radiation is permitted passage through the saturable absorber. In general, attenuation caused by the absorber is relatively low because the absorber is saturated into a transparent state at the desired wavelength.

Semiconductor saturable absorbers have been fabricated for narrowband and broadband response. Bulk semiconductor material and multiple quantum well heterostructures have been used for narrowband absorption applications while specially graded bandgap multiple quantum well heterostructures have been developed for broadband applications. In the quantum well realizations of such absorber devices, the quantum well heterostructure has been grown on a semiconductor quarter-wave stack reflector. In another embodiment known as an anti-resonant Fabry-Perot saturable absorber, a thin film oxide partial reflector stack was deposited on the quantum well heterostructure to form a Fabry-Perot etalon with the semiconductor quarter-wave stack reflector. For the latter device, the saturable absorber element (MQW) responds to radiation at wavelengths in the anti-resonant portion of the Fabry-Perot etalon response characteristic. This device produces weak coupling with the laser cavity and introduces less loss than other multiple quantum well devices used for modelocking the laser. By the same token, the anti-resonant Fabry-Perot saturable absorber requires significant additional device processing and optimization for its realization.

SUMMARY OF THE INVENTION

Low optical loss and simplified fabrication are achieved by a nonlinear reflector which incorporates one or more semiconductor quantum wells within a standard semiconductor quarter wave stack reflector. The nonlinear reflector called a saturable Bragg reflector provides an intensity dependent response which permits it to be used for saturable absorption directly in a main oscillating cavity of a laser. Saturation intensity of the nonlinear reflector and thereby related laser modelocking properties can be controlled by disposing the quantum well at a particular position in the reflector structure.

BRIEF DESCRIPTION OF THE DRAWING

A more complete understanding of the invention may be obtained by reading the following description of specific illustrative embodiments of the invention in conjunction with the appended drawing in which.

DETAILED DESCRIPTION

The saturable Bragg reflector employs a quarter wave stack dielectric reflector having a high reflectance which, in turn, incorporates one or more quantum wells disposed at predetermined location(s) within the reflector to provide the nonlinear characteristic for the reflector. This structure acts as a low loss saturable absorber which can be utilized directly within the main lasing cavity of a laser such as a solid state laser. Position of the quantum well, along with other factors, determines the saturation intensity of the saturable reflector. This device is grown by molecular beam epitaxy and requires no further processing such as growth, deposition, or oxidation to be ready for use as an intracavity saturable absorber.

Figure 1:
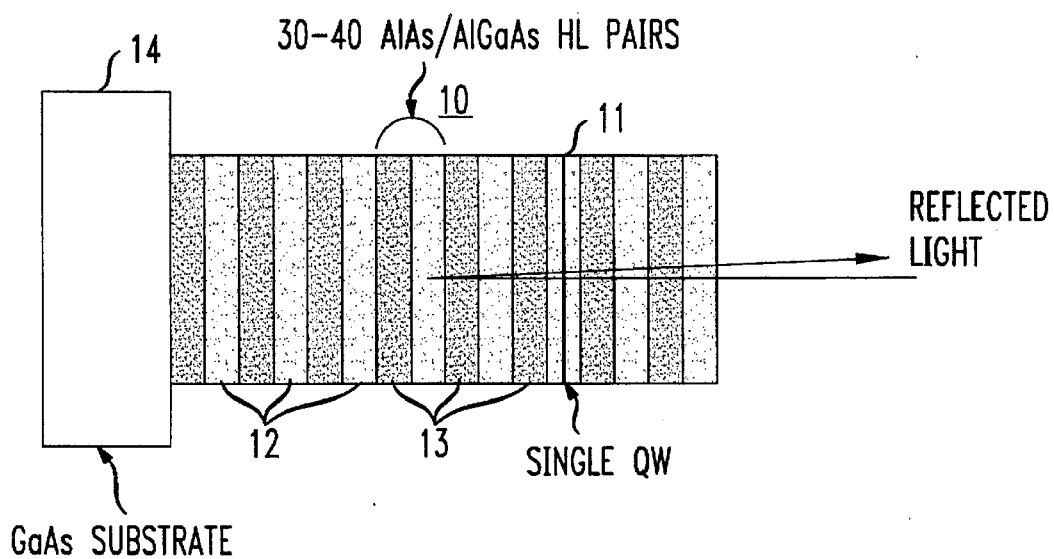
FIGS. 1 and 2 each show a cross-sectional view of alternative embodiments of the saturable Bragg reflector realized in accordance with the principles of the invention.
Figure 2:
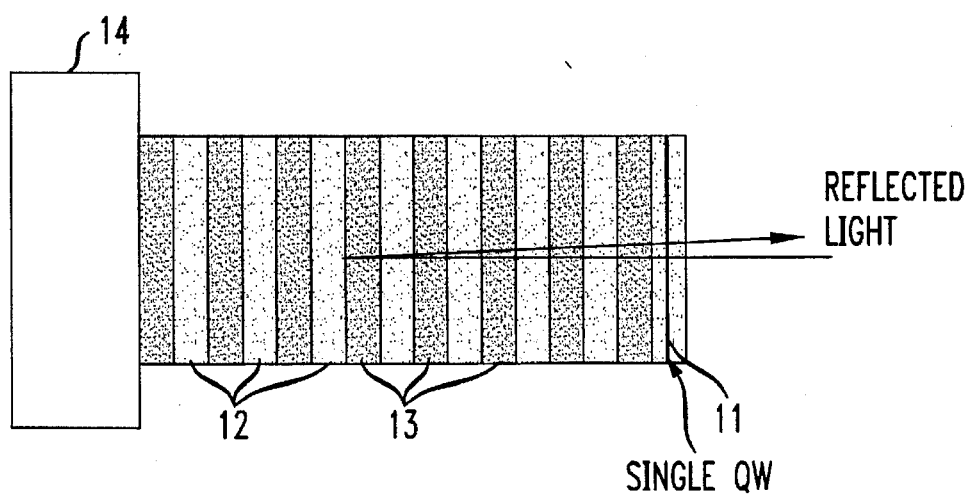

The illustrative embodiments of the invention shown in FIGS. 1 and 2 employ a single quantum well grown within the reflector structure. These devices are shown on a GaAs substrate 14 with layers formed in the AlAs/AlGaAs semiconductor compound system for illustrative purposes only.

In each device, the Bragg reflector comprises a series of alternating material layers having different refractive indices. It can also be viewed as a plurality of pairs of layers wherein each pair 10 of layers includes one wide energy bandgap layer and one narrow energy bandgap layer. When the layers are arranged with individual layer thicknesses approximating a quarter wavelength (one quarter of an optical path length), the stack of layers will form a mirror of reflectivity approaching unity. As shown in the FIGs., thirty to forty pairs of AlAs/AlGaAs layers form the reflector. The mole fraction x for the compound $AlGa_{1-x}As_x$ is varied between 1.0 in the wide bandgap AlAs layers 13 to 0.15 in the narrow bandgap AlGaAs layers 12. This system of layers is suitable for operation in the wavelength range around 850 nm. Since the reflector is a standard quarter wave stack design, the optical thickness of each layer should be approximately one-quarter of the desired wavelength of operation. The reflector alone without the quantum well exhibits an intensity independent reflectivity and, if placed in a laser cavity, will not influence or induce modelocking.

A single quantum well 11 provides saturable absorption, that is, intensity dependent absorption which is required for modelocking. The quantum well is grown near the top surface of the reflector (FIG. 2) when a low saturation intensity is desired; it is grown farther from the top surface of the reflector (FIG. 1) when a high saturation intensity is desired. Experimental results now show that high quality modelocking results occur when the quantum well is placed within the first quarter wave thick layer of the reflector where the intensity of the incident radiation is very high. The quantum well can be placed at other locations within the reflector. Additional quantum wells can be disposed within the reflector to obtain a particular saturation characteristic. In addition, the quantum wells can have differing thicknesses or bandgap energies to affect the range (bandwidth) of the saturation effect.

Since the quantum well interacts with the standing wave pattern of the optical signal, placement of the quantum well at a specific location within selected pair of layers also affects the saturation intensity. It is considered desirable, though not limiting, to place the quantum well near an intensity peak in the standing wave pattern.

Insertion of the quantum well or quantum wells within the reflector in no way changes the nature of the mirror from being a single, high reflectance reflector. The Bragg reflector, even though its structure is briefly interrupted by the quantum well, is still a single reflector and not an etalon or cavity reflector. The maximum reflectance of the saturable Bragg reflector in experimental practice is approximately 99.8% as shown by curve 31 in FIG. 3. The presence of the quantum well modifies the reflection (absorption) characteristic of the saturable Bragg reflector near the exciton wavelength marked with an x and arrow 32.

As shown in the FIGs., the quantum well layer is grown in the narrow bandgap AlGaAs layer. The mole fraction x for the quantum well is chosen so that the excitons are confined to a state below the bandgap of the narrow bandgap layers in the Bragg reflector. In the example from experimental practice, a mole fraction less than 0.15 is suitable for use. A quantum well thickness of approximately 100Å has been used in the experimental device with an exciton wavelength of approximately 850 nm.

It has been discovered that the thickness of the reflector layer which includes the quantum well can be maintained at its standard quarter wave thickness diminished by the quantum well thickness without any significant change in performance. That is, there is no need for a first approximation to account for the actual change in optical path length caused by the presence of the quantum well in the reflector layer. As such, the total thickness of the reflector layer together with the quantum well layer can be approximated with sufficiently good results by the quarter wave thickness of a standard reflector layer of the same material type without the quantum well.

Figure 3:
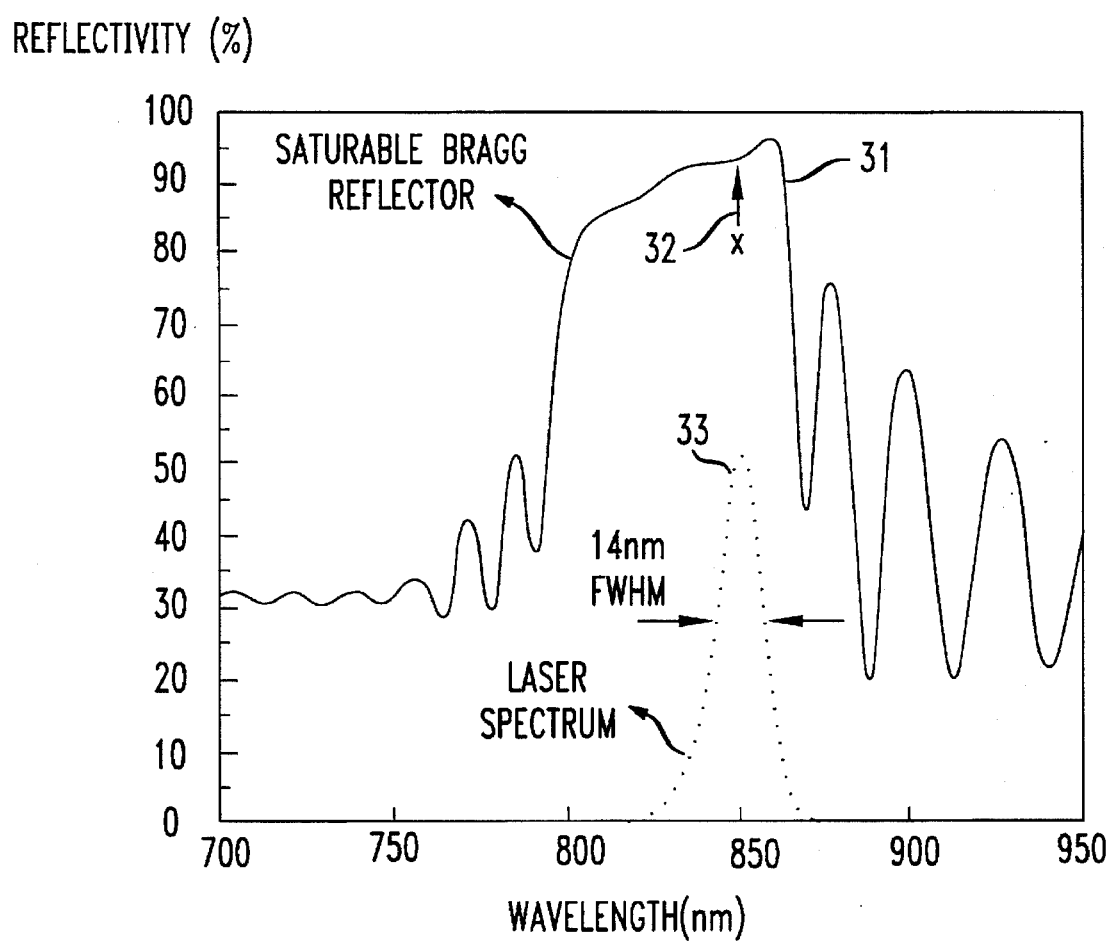
FIG. 3 shows a typical reflectivity curve for the saturable Bragg reflector.
Figure 4:
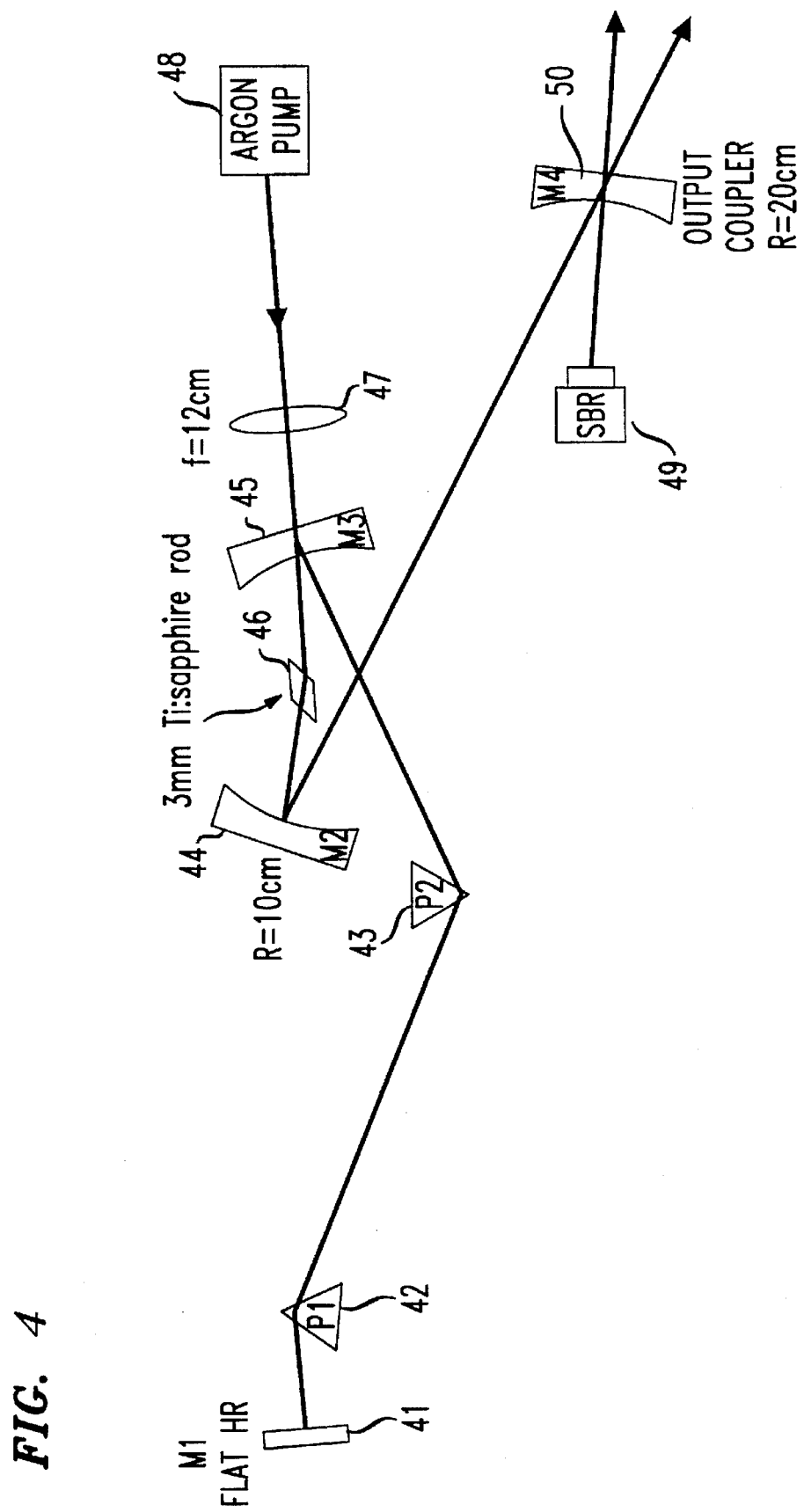
FIG. 4 shows a schematic diagram of a solid state laser including the saturable Bragg reflector as an intracavity element for laser modelocking.

FIG. 4 shows the saturable Bragg reflector (SBR) within the main cavity of a Ti:Sapphire laser for the purpose of modelocking the laser. Ti:Sapphire rod 46 (3 mm long) is pumped by argon laser 48. The Ti:Sapphire rod provides optical gain for the modelock laser. Lens 47 is used for coupling the pump beam into the optical cavity. The main laser cavity is formed between high reflectivity mirror 41 and the saturable Bragg reflector 49. Mirrors 44 and 45 are used for directing the optical signals through rod 46 as the gain medium. Brewster prisms 42 and 43 provide adjustable negative and positive dispersion which is used for pulse shaping. The saturable Bragg reflector is placed substantially at the focal point of 20 cm radius curved mirror 50. Output coupling of the optical pulses produced by the laser is provided through mirror 50. The laser spectrum is shown as curve 33 in FIG. 3.

Saturation of the saturable Bragg reflector modelocks the laser in FIG. 4 which produces a modelock sequence of optical pulses. Pulsewidth is determined by dispersion and bandwidth limiting properties of the saturable Bragg reflector. The arrangement shown in FIG. 4 has been used to generate ultrashort optical pulses having a pulse autocorrelation of approximately 90 fs.

The saturable Bragg reflector realized in experimental practice exhibited a reflectivity which was not flat over the band of interest as a result of systematic errors which occurred during MBE growth. This is shown in FIG. 3. If the saturable Bragg reflector were made with a flat-topped reflectivity spectrum over the band of interest, larger modelocked bandwidths could be attained. In addition, such a feature would be useful for tuning the laser.

It should be noted that the dispersion compensation provided by the Brewster prisms 42 and 43 can be removed from the laser cavity. In this case, pulsewidths of approximately 5 ps can be obtained from the laser. Self-starting for the modelocking process is readily obtained because the saturation nonlinearity is based upon energy of the incident radiation, not its intensity. As a result, the use of the saturable Bragg reflector in modelock lasers is advantaged over modelock lasers employing pure Kerr lenses.

It is contemplated that the quantum wells can be grown at low temperature to produce a short response time for the device. It is understood that, while the Group III-V material system AlAs/AlGaAs is described above for fabricating the saturable Bragg reflector, other material combinations may be selected from other semiconductor Group III-V systems such as GaAs/InGaAs, InGaAs/InGaAlAs, InGaAs/InAlAs, GaAs/AlAs, GaAsSb/GaAlAsSb and InGaAsP/InP to realize the device. In these semiconductor systems, the layers may be lattice-matched to suitable GaAs or InP substrates. Mismatching is also contemplated wherein strained layers are grown over the substrate material. Finally, extension of the device structures to semiconductor compounds in Group II-VI and Group IV is also contemplated.

What is claimed is:

1. A laser for generating an optical beam at a first wavelength, said laser comprising first and second end reflectors and a gain medium, said second end reflector including a quarter-wave stack of dielectric material layers and a quantum well layer within one of said layers in the quarter wave stack so that said second end reflector provides a nonlinear saturation response to incident radiation in order to modelock said laser.

2. The laser as defined in claim 1 wherein the quarter-wave stack comprises a plurality of alternately wide and narrow bandgap semiconductor material.

3. The laser as defined in claim 2 wherein the quantum well is located in an uppermost layer of said quarter wave stack.

4. The laser as defined in claim 3 wherein the wide bandgap layers comprise AlGaAs and the narrow bandgap layers comprise AlAs.

5. The laser as defined in claim 2 wherein the quantum well is located proximate a top surface of said quarter wave stack.

6. A dielectric mirror comprising a quarter-wave stack of dielectric material layers and a quantum well layer within one of said layers in the quarter wave stack so that said dielectric mirror provides a nonlinear saturation response to incident radiation.

7. The laser as defined in claim 6 wherein the quarter-wave stack comprises a plurality of alternately wide and narrow bandgap semiconductor material.

8. The laser as defined in claim 7 wherein the quantum well is located in an uppermost layer of said quarter wave stack.

9. The laser as defined in claim 8 wherein the wide bandgap layers comprise AlGaAs and the narrow bandgap layers comprise AlAs.

10. The laser as defined in claim 7 wherein the quantum well is located proximate a top surface of said quarter wave stack.

* * * * *